United States Patent
Feilen

(10) Patent No.: US 10,897,316 B1
(45) Date of Patent: Jan. 19, 2021

(54) TEST SYSTEM AND METHOD FOR DETERMINING A RESPONSE OF A TRANSMISSION CHANNEL

(71) Applicant: Rohde & Schwarz GmbH & Co. KG, Munich (DE)

(72) Inventor: Michael Feilen, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/581,122

(22) Filed: Sep. 24, 2019

(51) Int. Cl.
H04B 17/00 (2015.01)

(52) U.S. Cl.
CPC .............................. H04B 17/0085 (2013.01)

(58) Field of Classification Search
CPC .................................................. H04B 17/0085
USPC ....................................................... 455/67.14
See application file for complete search history.

(56) References Cited

U.S. PATENT DOCUMENTS

| | | | | |
|---|---|---|---|---|
| 6,690,722 B1* | 2/2004 | Dunsmore | ................ | H04B 3/46 324/601 |
| 7,561,987 B2* | 7/2009 | Nakayama | .............. | G01R 27/28 702/182 |
| 7,809,517 B1* | 10/2010 | Zuckerman | ...... | G01R 31/31709 702/72 |
| 7,868,607 B2* | 1/2011 | Dunsmore | ............. | G01R 27/32 324/76.23 |
| 8,019,286 B2* | 9/2011 | Lorenzen | ................ | H04B 17/13 455/67.11 |
| 8,744,370 B2* | 6/2014 | Dunsmore | ............. | H04B 17/21 455/67.16 |
| 10,284,236 B1* | 5/2019 | Trotta | ................ | H04B 17/0085 |
| 10,659,177 B1* | 5/2020 | Leffel | ..................... | H01Q 3/267 |
| 10,768,215 B2* | 9/2020 | Leibfritz | ................ | G01R 29/06 |
| 2005/0240852 A1* | 10/2005 | Inaba | ............... | G01R 31/31905 714/740 |
| 2011/0288820 A1* | 11/2011 | Bednorz | ................ | H04B 3/462 702/176 |
| 2012/0256639 A1* | 10/2012 | Pausini | ............ | G01R 31/31709 324/613 |
| 2014/0306719 A1* | 10/2014 | Dunsmore | ........... | G01R 35/005 324/601 |
| 2015/0177300 A1* | 6/2015 | Paech | ..................... | G01R 27/32 702/66 |
| 2018/0080965 A1* | 3/2018 | Stein | ....................... | G01R 23/02 |
| 2019/0072598 A1* | 3/2019 | Leibfritz | ................ | G01R 27/06 |
| 2020/0110118 A1* | 4/2020 | Leibfritz | ................ | G01R 29/06 |

* cited by examiner

Primary Examiner — April G Gonzales
(74) Attorney, Agent, or Firm — Christensen O'Connor Johnson Kindness PLLC

(57) ABSTRACT

A test system for determining a response function of a transmission channel is disclosed. The transmission channel comprises an input, a mixer, a device under test and a coupling unit. The test system comprises a local oscillator, a delay unit, a combiner and an analysis module. The analysis module is configured to determine the response function of the transmission channel based on a superposed signal, wherein the superposed signal comprises an output signal of a device under test and a delayed oscillator signal. Further, a method for determining a response function of a transmission channel is disclosed.

18 Claims, 2 Drawing Sheets

TEST SYSTEM AND METHOD FOR DETERMINING A RESPONSE OF A TRANSMISSION CHANNEL

FIELD OF THE DISCLOSURE

Embodiments of the present disclosure relate generally to a test system for determining a response function of a transmission channel, for instance at least one of an amplitude response, a phase response, a frequency response and a transfer function of the transmission channel. Embodiments of the present disclosure further relate to a method determining a response function of a transmission channel, for instance at least one of an amplitude response, a phase response, a frequency response and a transfer function of the transmission channel.

BACKGROUND

When generating transmission signals for radio communication, usually a known input signal is generated initially that has desired and known properties. This input signal is then filtered and amplified with miscellaneous electronic components such that an output signal is generated. The output signal may then be transmitted, e.g. via RF antennas.

A common problem is that the electronic components used for filtering and amplifying the input signal usually alter the amplitude characteristics and/or the phase characteristics of the input signal. In other words, even if all properties of the input signal are perfectly known, this may not be the case for the transmitted output signal because the electronic components alter these properties in a potentially unknown way.

Accordingly, there is a need for a test system as well as for a method that enable a recovery of unknown properties of a generated output signal.

SUMMARY

Embodiments of the present disclosure provide a test system for determining a response function of a transmission channel that comprises, in an embodiment, an input, a mixer, a device under test and a coupling unit. In an embodiment, the test system comprises a local oscillator, a delay unit, a combiner and an analysis module. The local oscillator is configured to generate an oscillator signal having a predetermined frequency. The local oscillator further is configured to forward the oscillator signal to the mixer and to the delay unit. The mixer is configured to mix the oscillator signal with an input signal received via the input, thereby generating an intermediate frequency signal. The device under test is configured to process the intermediate frequency signal, thereby generating an output signal. The coupling unit is configured to forward at least a portion of the output signal to the combiner. The delay unit is configured to forward the oscillator signal to the combiner with a predetermined time delay, thereby generating a delayed oscillator signal. The combiner is configured to combine the delayed oscillator signal and the portion of the output signal, thereby generating a superposed signal. The analysis module is configured to determine the response function of the transmission channel based on the superposed signal.

Therein and in the following, the term "response function" generally represents a mathematical function and/or or other quantities reflecting the behavior of the transmission channel when an electrical signal is applied to the transmission channel.

The test system according to the disclosure is based on the finding that the response function of the transmission channel can be determined in a convenient way by superposing the output signal generated by the transmission channel with a delayed oscillator signal, and by analyzing the resulting superposed signal, for example based on a mathematical model of the test system.

In other words, there are two signal paths through which the electrical signals can propagate in parallel, but through which the electrical signals have different propagation times. The first path comprises the device under test and the coupling unit, while the second path comprises the delay unit.

By combining the outputs of the two paths having different propagation times, additional information about the output signal can be obtained, for example phase information and/or amplitude information on the output signal.

The test system described above can be integrated into transmission devices, such that additional information on a signal transmitted by the transmission device is available in a particularly simple and cost-efficient fashion, as only few additional components are required. For example, additional phase information and/or amplitude information on the output signal is recovered by the test system described above.

According to an embodiment of the present disclosure, the response function comprises at least one of an amplitude response, a phase response, a frequency response, a step response, an impulse response and a transfer function of the transmission channel. All these quantities are interrelated and describe different aspects of the behavior of the transmission channel when an electrical signal is applied to the transmission channel.

Depending on which of these quantities is determined, another aspect of the output signal is recovered. For example, if the frequency response and/or the transfer function of the transmission channel is determined, the knowledge on both the amplitude and the phase of the output signal is recovered, as both of these quantities directly link amplitude and phase of the input signal to the amplitude and phase of the output signal.

According to another embodiment of the present disclosure, the analysis module comprises a power measurement module being configured to determine a power signal of the superposed signal, and wherein the analysis module is configured to determine the response function of the transmission channel based on the power signal.

Generally speaking, the power signal comprises information on at least one power parameter of the superposed signal. The power parameter may be a power level, a maximum power, a power spectral density, etc.

In an embodiment, the power signal may comprise at least one of a square of an absolute value of the superposed signal and a time average of the square of an absolute value of the superposed signal.

The analysis module may comprise a digital processing module being connected to the power measurement module, wherein the digital processing module is configured to determine the response function of the transmission channel based on the power signal. In other words, the power signal is sampled, particularly by the power measurement module, such that a digital representation of the power signal is forwarded to the digital processing module.

In an embodiment, the digital processing module is configured to determine the response function of the transmission channel based on a mathematical model of the test system.

In an embodiment, the analysis module is configured to multiply the power signal with a phase factor depending on the frequency of the oscillator signal and a propagation time difference between the delayed oscillator signal and the portion of the output signal. The multiplication with an appropriately chosen phase factor results in a down-conversion of the power signal in frequency domain, e.g., effectively in a reduction of the frequency of the power signal.

According to an aspect of the present disclosure, the analysis module is configured to filter the power signal multiplied with the phase factor, thereby generating a filtered power signal, and wherein the analysis module is configured to determine the response function of the transmission channel based on the filtered power signal. By appropriately choosing the phase factor and a bandwidth of the filter, certain portions of the power signal (in frequency domain) can be isolated.

According to a further aspect of the present disclosure, the analysis module is configured to filter the power signal multiplied with the phase factor via a low-pass filter. This way, a low frequency portion of the power signal is isolated. It has turned out that the low frequency portion of the power signal can be used to obtain the response function of the transmission channel, for example the frequency response of transmission channel.

The coupling unit may be established as at least one of a coupler, a switch and a RF tap. Put differently, the coupling unit may be established by a coupler, a switch and/or a RF tap. The coupling unit may forward the whole output signal to the combiner if the coupling unit is a switch. The coupling unit may forward a predetermined portion of the output signal e.g., between 10% and 90% of the output signal to the combiner if the coupling unit is a coupler. The coupling unit may forward only a small portion of the output signal to the combiner, particularly less than 10% or even less than 5% of the output signal, if the coupling unit is a RF tap.

In another embodiment of the present disclosure, the analysis module is configured to determine the response function of the transmission channel based on a response function of the delay unit. The response function of the delay unit is known and thus can be used to obtain the response function of the transmission channel. In an embodiment, the amplitude response, the phase response, the frequency response, the step response, the impulse response and/or the transfer function of the delay unit are known and can be used to obtain the amplitude response, the phase response, the frequency response, the step response, the impulse response and/or the transfer function of the transmission channel.

In an embodiment, the analysis module is configured to determine the response function of the transmission channel based on a response function of the coupling unit. The response function of the coupling unit is known and thus can be used to obtain the response function of the transmission channel. In particular the amplitude response, the phase response, the frequency response, the step response, the impulse response and/or the transfer function of the coupling unit are known and can be used to obtain the amplitude response, the phase response, the frequency response, the step response, the impulse response and/or the transfer function of the transmission channel.

The local oscillator may be established as a numerically controlled oscillator. Via the numerically controlled oscillator, an arbitrary oscillator signal with desired properties can be generated.

Embodiments of the present disclosure further provide a method for determining a response function of a transmission channel comprising a device under test. In an embodiment, the method comprises the following steps:

receiving an input signal;

generating an oscillator signal having a predetermined frequency;

mixing the oscillator signal with the input signal, thereby generating an intermediate frequency signal;

processing the intermediate frequency signal via a device under test, thereby generating an output signal;

delaying the oscillator signal by a predetermined time delay via a delay unit, thereby generating a delayed oscillator signal;

superposing at least a portion of the output signal with the delayed oscillator signal, thereby generating a superposed signal; and determining the response function of the transmission channel based on the superposed signal.

Regarding the advantages and properties, reference is made to the explanations given above with respect to the test system, which also hold for the method and vice versa.

According to an aspect of the present disclosure, the response function comprises at least one of an amplitude response, a phase response, a frequency response, a step response, an impulse response and a transfer function of the transmission channel. All these quantities are interrelated and describe different aspects of the behavior of the transmission channel when an electrical signal is applied to the transmission channel.

Depending on which of these quantities is determined, another aspect of the output signal is recovered. For example, if the frequency response and/or the transfer function of the transmission channel is determined, the knowledge on both the amplitude and the phase of the output signal is recovered, as both of these quantities directly link amplitude and phase of the input signal to the amplitude and phase of the output signal.

According to another aspect of the present disclosure, a square of an absolute value of the superposed signal is determined, thereby generating a power signal, and wherein the response function of the transmission channel is determined based on the power signal. Generally speaking, the power signal comprises information on at least one power parameter of the superposed signal. As already mentioned, the power parameter may be a power level, a maximum power, a power spectral density, etc. The at least one power parameter can be used to determine the response function.

The power signal may be determined as a time averaged square of the absolute value of the superposed signal.

In an embodiment, the power signal is multiplied with a phase factor depending on the frequency of the oscillator signal and a propagation time difference between the delayed oscillator signal and the portion of the output signal. The multiplication with an appropriately chosen phase factor results in a down-conversion of the power signal in frequency domain, e.g., effectively in a reduction of the frequency of the power signal.

In another embodiment of the present disclosure, the power signal multiplied with the phase factor is filtered via a low-pass filter, thereby generating a filtered power signal, and wherein the analysis module is configured to determine the response function of the transmission channel based on the filtered power signal. By appropriately choosing the phase factor and a bandwidth of the filter, certain portions of the power signal (in frequency domain) can be isolated. It has turned out that the low frequency portion of the power signal can be used to obtain the response function of the transmission channel, particularly the frequency response of transmission channel.

According to a further aspect of the present disclosure, the response function of the transmission channel is determined based on a response function of the delay unit. The response function of the delay unit is known and thus can be used to obtain the response function of the transmission channel. In particular the amplitude response, the phase response, the frequency response, the step response, the impulse response and/or the transfer function of the delay unit are known and can be used to obtain the amplitude response, the phase response, the frequency response, the step response, the impulse response and/or the transfer function of the transmission channel.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
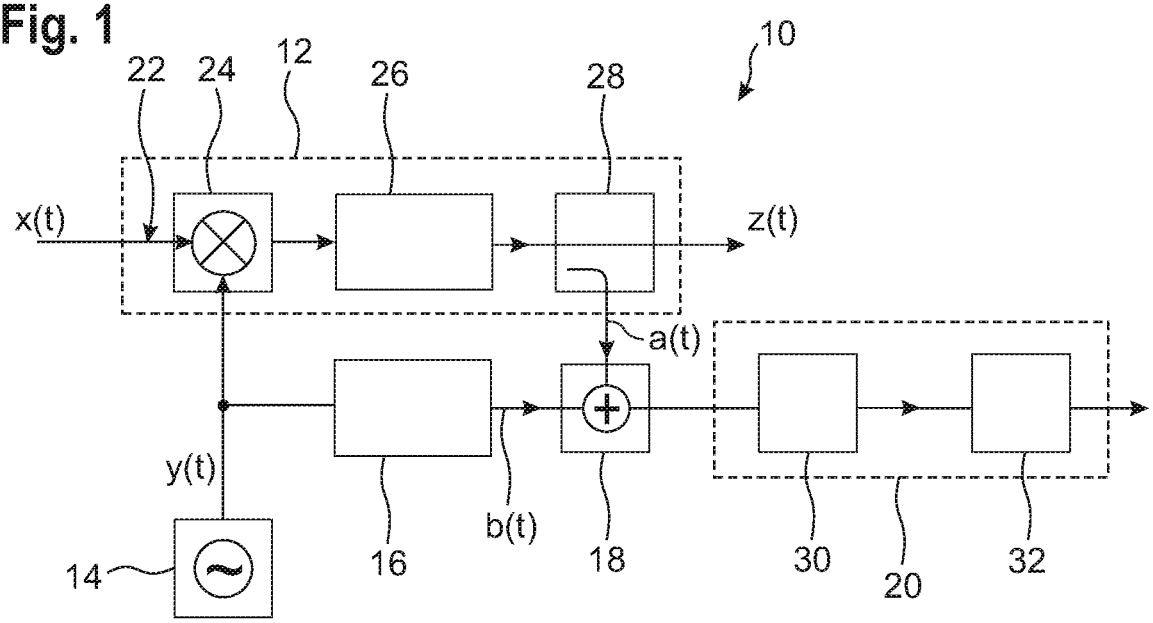
FIG. 1 schematically shows a test system according to the disclosure.

FIG. 1 schematically shows a test system 10 comprising a transmission channel 12, a local oscillator 14, a delay unit 16, a combiner 18 and an analysis module 20. In an embodiment, the transmission channel 12 comprises an input 22, a mixer 24, a device under test 26 and a coupling unit 28.

The analysis module 20 comprises a power measurement module 30 and a digital processing module 32. As use herein, the term "module" is understood to comprise hardware and/or software, as appropriate for the actual context and type of system or signal that is to be tested. In some embodiments, for example, a module may include hardware and/or software for implementing the functionalities, technologies and methodologies described herein. In some embodiments, a module may include one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof. In an embodiment, a module may include combinations of circuits and computer program products having software or firmware instructions stored on one or more computer readable memories that work together to cause a device to perform one or more methodologies or technologies described herein. In other embodiments, a module is implemented solely in analog and/or digital circuitry. Of course, in some embodiments, two or more modules, or parts thereof, can be integrated or share hardware and/or software, circuitry, etc.

Referring still to FIG. 1, the mixer 24 is connected to both the input 22 and the local oscillator 14 downstream of the input 22 and the local oscillator 14, respectively. Therein and in the following, the terms "downstream" and "upstream" are understood to describe the usual direction of flow of electrical signals between the individual components, wherein the electrical signals propagate from the upstream component to the downstream component.

The device under test 26 is connected to the mixer 24 and is arranged downstream of the mixer 24. The coupling unit 28, in turn, is arranged downstream of the device under test 26 and is connected to the device under test 26 in a signal transmitting manner.

The delay unit 16 is connected to the local oscillator 14 downstream of the local oscillator 14, such that the mixer 24 and the delay unit 16 are both directly connected with the local oscillator 14.

The combiner 18 is connected to both the coupling unit 28 and to the delay unit 16 downstream of both the coupling unit 28 and the delay unit 16. In an embodiment, the combiner 18 is directly connected to both the coupling unit 28 and the delay unit 16.

Generally speaking, the test system 10 is configured to determine a response function of the transmission channel 12. Therein and in the following, the term "response function" generally describes a quantity, particularly a function, that reflects at least one aspect of the transmission channels' 12 behavior when an electrical signal is applied to the transmission channel 12, particularly inputted via input 22. Accordingly, the response function may comprise, for example, at least one of an amplitude response, a phase response, a frequency response, an impulse response, a step response, and a transfer function of the transmission channel 12.

Figure 2:
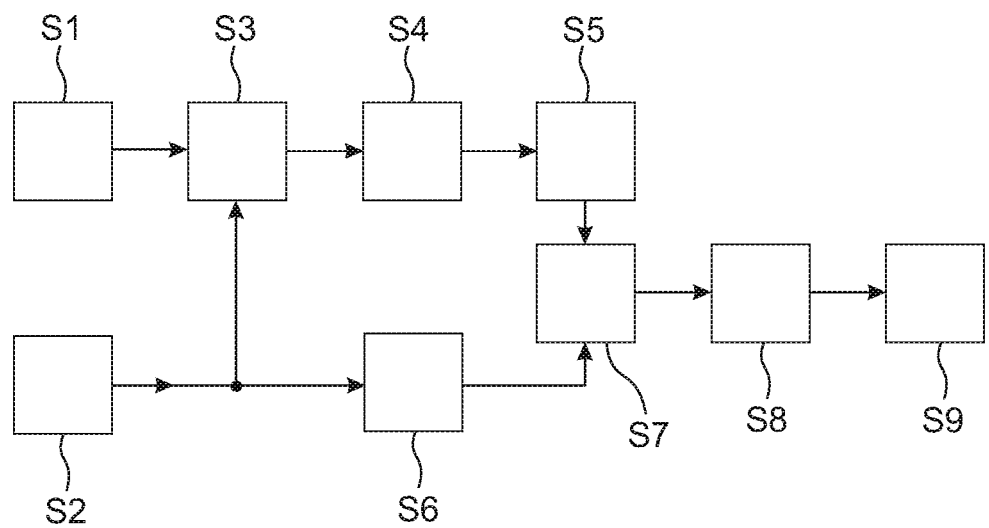
FIG. 2 shows a block diagram of a method according to the disclosure.

The test system 10 is configured to perform a method for determining the response function of the transmission channel 12. The method is described in the following in more detail with reference to FIG. 2.

In the following, the letters t and r generally represent times, the letters $\omega$ and f generally represent angular frequencies and frequencies, respectively, and the letter $\phi$ generally represents a phase, unless explicitly stated otherwise.

An input signal x(t) is received via the input 22 and forwarded to the mixer 24 (step S1).

The input signal x(t) is a complex-valued baseband signal, with the general form $x(t)=|x(\omega_x)| \cdot e^{i(\omega_x \cdot t + \phi_x(\omega_x))}$.

In an embodiment, in the I/Q-modulated case the input signal x(t) is given as $x(t)=|x(\omega_x=0)| \cdot e^{i(\omega_x \cdot t + \phi_x(\omega_x))}$, e.g., with an amplitude that is constant over frequency.

An oscillator signal y(t) is generated by the local oscillator 14 and forwarded to both the mixer 24 and to the delay unit 16 (step S2). Thus, the local oscillator 14 may be established as a numerically controlled oscillator 14.

The oscillator signal y(t) has a predetermined angular frequency $\omega_c$, wherein $\omega_c$ may be selected from a predetermined interval $I=[2\pi f_{start}, 2\pi f_{stop}]$ having a lower boundary $2\pi f_{start}$ start and an upper boundary $2\pi f_{stop}$. In other words, the predetermined angular frequency $\omega_c$ may be selected from a predetermined bandwidth.

In an embodiment, the predetermined angular frequency $\omega_c$ may be selected from a discrete grid of frequencies, such that $\omega_c \in 2\pi\{f_{start}, f_{start}+\Delta f, f_{start}+2\Delta f_{stop}, (\ldots), f_{stop}\}$. Therein, $\Delta f$ is the distance (in frequency domain) between the individual points of the frequency grid, i.e. the grid spacing. The grid spacing $\Delta f$ may be, for example, 10 MHz.

The oscillator signal has the general form $y(t)=y_0(\omega_c)e^{i(\omega_x \cdot t+\phi_x(\omega_x))}$. Without restriction of generality, $y_0(\omega_c)$ is set equal to 1 in the following in order to enhance legibility.

The input signal $x(t)$ and the oscillator signal $y(t)$ are then multiplicatively mixed by the mixer 24, such that an intermediate frequency signal $m(t)=ix(\omega_x)|\cdot e^{i(\omega_x \cdot t+\phi_x(\omega_x))}$ is generated (step S3).

The intermediate frequency signal $m(t)$ is forwarded to the device under test 26 and processed by the device under test 26, thereby generating an output signal $z(t)$ (step S4).

For example, RF transmission circuitry and/or transmission antennas may be concatenated to the device under test 26, e.g., the output signal may be a transmission signal that is to be transmitted via radio.

At least a portion $a(t)$ of the output signal $z(t)$ is then forwarded to the combiner 18 via the coupling unit 28 (step S5). The coupling unit 28 may be established as at least one of a switch, a coupler and a RF tap.

In other words, the coupling unit 28 may forward the whole output signal $z(t)$ to the combiner 18 if the coupling unit 28 is a switch. The coupling unit 28 may forward a predetermined portion of the output signal $z(t)$, e.g. between 10% and 90% of the output signal $z(t)$ to the combiner 18 if the coupling unit 28 is a coupler. The coupling unit 28 may forward only a small portion of the output signal $z(t)$ to the combiner 18, particularly less than 10% or even less than 5% of the output signal $z(t)$, if the coupling unit 28 is a RF tap.

Parallel to steps S3 to S5, the oscillator signal $y(t)$ is delayed by the delay unit 16 (step S6). By delaying the oscillator signal $y(t)$, a delayed oscillator signal $b(t)$ is generated, which is also forwarded to the combiner 18.

The portion $a(t)$ of the output signal and the delayed oscillator signal $b(t)$ are then superposed by the combiner 18 (step S7). In other words, the combiner 18 adds the portion $a(t)$ of the output signal $z(t)$ and the delayed oscillator signal $b(t)$ with correct phase, resulting in a superposed signal $a(t)+b(t)$.

The superposed signal is forwarded to and analyzed by the analysis module 20. For example, the superposed signal is forwarded to the power measurement module 30, which determines a power signal $p(t)$ of the superposed signal (step S8).

The power signal $p(t)$ is the square of the absolute value of the superposed signal, i.e. $p(t)=(a(t)+b(t))\cdot(a^*(t)+b^*(t))$, wherein "*" denotes complex conjugation. Generally speaking, the power signal $p(t)$ comprises information on at least one power parameter of the superposed signal, e.g., the power parameter is a power level, a maximum power, a power spectral density, etc. Moreover, a time average P of the power signal $p(t)$ is determined by the power measurement module 30, i.e.

$$P = \frac{1}{T}\int_0^T p(t)dt.$$

The power measurement module 30 samples the power signal and/or the time average P such that a digital representation of the power signal and/or the time averaged power signal P is obtained.

Figure 3:
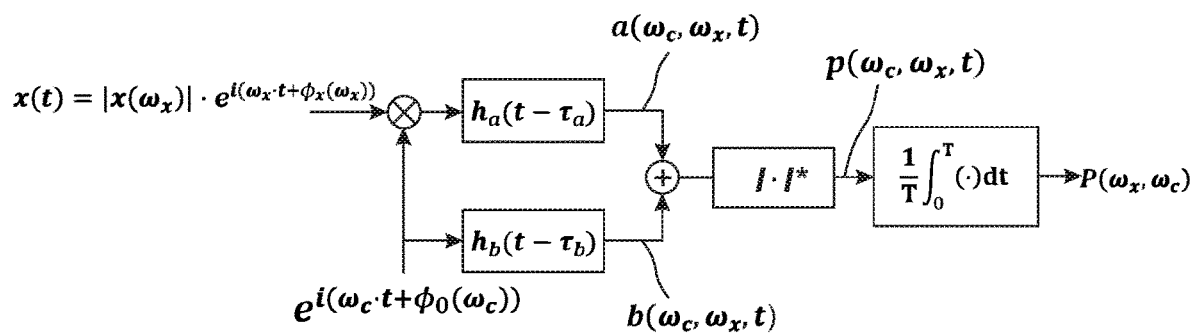
FIG. 3 shows a block diagram of a mathematical model of the test system of FIG. 1.

The power signal $p(t)$ or rather the time averaged power signal P is forwarded to the digital processing module 32 and is used for determining the response function of the transmission channel 12 (step S9). The analysis of the power signal $p(t)$ or rather of the time averaged power signal P is based on a mathematical model of the test system 10, which is schematically illustrated in FIG. 3. In some embodiments, such analysis can be carried out in analog/digital circuitry, programmed processors, such as a microprocessor, an ASIC, a DSP, one or more circuits, or the like.

In this mathematical model of the test system 10, the two paths via which the electrical signals travel are described by impulse responses $h_a(t-\tau_a)$ and $h_b(t-\tau_b)$.

The first path comprises the device under test 26 and the coupling unit 28. In time domain, the first path is represented by the impulse response $h_a(t-\tau_a)$, while in frequency domain the first path is represented by the frequency response $H_a(\omega_x+\omega_c)$.

This reflects the fact that the signals propagating through the first and the second path are delayed by different times, namely by $\tau_a$ and $\tau_b$, respectively. Accordingly, a propagation time difference between the two paths is given by $\Delta\tau=\tau_b-\tau_a$.

The second path comprises the delay unit 16. In time domain, the second path is represented by the impulse response $h_b(t-\tau_b)$, while in frequency domain the first path is represented by the frequency response $H_b(\omega_c)$.

Based on the mathematical model, the results for the portion $a(t)$ of the output signal forwarded to the combiner 18 and for the delayed oscillator signal $b(t)$ are:

$$a(t)=|x(\omega_x)|\cdot|H_a(\omega x+\omega_c)|\cdot e^{i\phi_a},$$

$$b(t)=|H_b(\omega_c)|\cdot e^{i\phi_b}, \text{ with}$$

$$\phi_a=\phi_{H_a}(\omega_x+\omega_c)+(\omega_x+\omega_c)\cdot t+\phi_x(\omega_x)+\phi_0(\omega_c)-(\omega_x+\omega_c)\tau_a,$$
and $$\phi_b=\phi_{H_b}(\omega_c)+\omega_c\cdot t+\phi_0(\omega_c)-\omega_c\tau_b.$$

Further, a model result for the averaged power signal $P(\omega_x, \omega_c)$ is calculated based on the mathematical model described above. The model result is $$P(\omega_x,\omega_c)=F(\omega_x,\omega_c)+N(\omega_x,\omega_c), \text{ wherein}$$

$$F(\omega_x,c\sigma_c)=|x(\omega_x)|^2\cdot|H_a(\omega_x+\omega_c)|^2+|H_b(\omega_c)|^2, \text{ and}$$

$$N(\omega_x, \omega_c) = 2|x(\omega_x)|\cdot|H_a(\omega_x+\omega_c)||H_b(\omega_c)|\cdot\frac{1}{T}\int_0^T\cos(\phi_b-\phi_a)dt.$$

The time averaged power signal P comprises two terms, namely an error signal F $(\omega_x, \omega_c)$ and a useful signal $N(\omega_x, \omega_e)$.

The model result $P(\omega_x, \omega_c)=F(\omega_x, \omega_c)+N(\omega_x, \omega_c)$ is then used to obtain the response function of the transmission channel 12. In the following, this will be illustrated for the case of $\omega_x=0$. However, it is to be understood that the same principal steps can also be performed in the general case $\omega_x \neq 0$.

For this purpose, the averaged power signal P is then multiplied with a phase factor $e^{-i\omega_c\Delta\tau}$ that depends on the propagation time difference M between the two paths, resulting in a down-conversion of the averaged power signal. The result of this is $P_{MIX}(\omega_x=0, \omega_c)=e^{-\omega_c\Delta\tau}P(\omega_x, \omega_c)=$ $$P_{MIX}(\omega_x = 0, \omega_c) = e^{-i\omega_c\Delta\tau}P(\omega_x, \omega_c) = F(\omega_c)e^{-i\omega_c\Delta\tau} +$$

$$|N(\omega_c)|\left(e^{i(\phi_{H_b}(\omega_c)-\phi_{H_a}(\omega_c)-2\omega_c\Delta\tau-\phi_x(0))} + e^{-i(\phi_{H_b}(\omega_c)-\phi_{H_a}(\omega_c)-\phi_x(0))}\right).$$

The down-converted power signal $P_{MIX}$ is then filtered with a low pass, thereby generating a filtered power signal $P_{LP}D(\omega_x=0, \omega_c)=P_{MIX}(\omega_x=0, \omega_c)\otimes h_{LP}(\tau)$, wherein $h_{TP}(\tau)$ is the impulse response of the low pass filter.

Due to the low-pass filtering, the contribution from $F(\omega_c)$ is removed and the result is $$P_{LP}(\omega_x = 0, \omega_c) \approx |N(\omega_c)| \cdot e^{-i(\phi_{H_b}(\omega_c)-\phi_{H_a}(\omega_c)-\phi_x(0))}.$$

Finally, the known frequency response $$H_b(\omega_c) = |H_b(\omega_c)| \cdot e^{i\phi_{H_b}}$$

of the delay unit 16 is removed from the filtered power signal $P_{TP}$, thereby obtaining the frequency response $H_a(\omega_c)$ of the transmission channel 12.

More specifically, the known frequency response $H_b(\omega_c)$ is removed by dividing the filtered power signal $P_{LP}$ by the complex conjugate of the known frequency response $H_b(\omega_c)$, namely $H_b^*(\omega_c)$, i.e.

$$\frac{P_{LP}(\omega_x = 0, \omega_c)}{H_b^*(\omega_c)} = |H_a(\omega_c)||x(0)| \cdot e^{+i(\phi_{H_a}(\omega_c)+\phi_x(0))} = H_a(\omega_c) \cdot x(0).$$

Thus, as the power signal p(t) or rather the time averaged power signal P is measured via the power measurement module 30, the measurement result obtained by the power measurement module 30 can be used to determine the frequency response $H_a(\omega_c)$ of the transmission channel 12

The input signal at zero frequency x(0) is also known. Thus, the contribution of x(0) can, if necessary, be removed by dividing the filtered power signal $P_{LP}$ by x(0). The result then is equal to the frequency response $H_a(\omega_c)$ of the transmission channel 12.

It is noted that while in the example given above the frequency response of the transmission channel is determined, one may also determine an amplitude response, a phase response, a step response, an impulse response and/or a transfer function of the transmission channel 12 in an analogous way.

Summarizing, the test system 10 described above determines the response function, for example the frequency response of the transmission channel 12 by superposing the output signal generated by the transmission channel 12 with a delayed oscillator signal, and by analyzing the resulting power signal based on a mathematical model of the test system 10.

Thus, by combining the outputs of the two paths having different propagation times, additional information on the output signal z(t) is restored, more precisely phase information and/or amplitude information on the output signal z(t).

For example, by determining the frequency response $H_a(\omega_x, \omega_e)$, the knowledge on both the amplitude and the phase of the output signal z(t) is recovered, as the frequency response $H_a$ directly links the amplitude and the phase of the input signal x(t) to the amplitude and the phase of the output signal z(t).

It will be appreciated that one or more components have been described herein as capable of "processing" signals or data, "transmitting" signals or data, "filtering" signals or data, "generating" signals or data, "analysing" signals or data, "converting" signals or data and the like, or that various signals or data are being "analysed," "compared," "filtered," "measured", "generated" etc., by such components. These functionalities can be carried out in embodiments of the present disclosure by combinations of circuits and computer program products having software or firmware instructions stored on one or more computer readable memories that work together to cause a device to perform one or more methodologies or technologies described herein. In other embodiments, analog circuitry, digital circuitry, or a combination of analog and digital circuitry can be configured and arranged in order to implement the functionalities, technologies and methodologies set forth herein.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system for determining a response function of a transmission channel, the test system comprising:
    a transmission channel comprising an input, a mixer, a device under test and a coupling unit;
    a local oscillator;
    a delay unit;
    a combiner; and
    an analysis module,
    said local oscillator being configured to generate an oscillator signal having a predetermined frequency, said local oscillator further being configured to forward the oscillator signal to the mixer and to the delay unit,
    said mixer being configured to mix said oscillator signal with an input signal received via said input, thereby generating an intermediate frequency signal, said device under test being configured to process the intermediate frequency signal, thereby generating an output signal, said coupling unit being configured to forward at least a portion of said output signal to the combiner, said delay unit being configured to forward the oscillator signal to the combiner with a predetermined time delay, thereby generating a delayed oscillator signal, said combiner being configured to combine the delayed oscillator signal and said portion of the output signal, thereby generating a superposed signal, and said analysis module being configured to determine the response function of the transmission channel based on the superposed signal.

2. The test system of claim 1, wherein the response function comprises at least one of an amplitude response, a phase response, a frequency response, a step response, an impulse response and a transfer function of the transmission channel.

3. The test system of claim 1, wherein the analysis module comprises a power measurement module being configured to determine a power signal of the superposed signal, and wherein the analysis module is configured to determine the response function of the transmission channel based on said power signal.

4. The test system of claim 3, wherein the analysis module comprises a digital processing module being connected to the power measurement module, and wherein the digital processing module is configured to determine the response function of the transmission channel based on said power signal.

5. The test system of claim 3, wherein the analysis module is configured to multiply said power signal with a phase factor depending on the frequency of the oscillator signal and a propagation time difference between the delayed oscillator signal and said portion of the output signal.

6. The test system of claim 5, wherein the analysis module is configured to filter said power signal multiplied with said phase factor, thereby generating a filtered power signal, and wherein the analysis module is configured to determine the response function of the transmission channel based on said filtered power signal.

7. The test system of claim 6, wherein the analysis module is configured to filter said power signal multiplied with said phase factor via a low-pass filter.

8. The test system of claim 1, wherein the coupling unit is established as at least one of a coupler, a switch and a RF tap.

9. The test system of claim 1, wherein the analysis module is configured to determine the response function of the transmission channel based on a response function of the delay unit.

10. The test system of claim 1, wherein the analysis module is configured to determine the response function of the transmission channel based on a response function of the coupling unit.

11. The test system of claim 10, wherein the local oscillator is established as a numerically controlled oscillator.

12. A method for determining a response function of a transmission channel comprising a device under test, comprising the following steps:

receiving an input signal;

generating an oscillator signal having a predetermined frequency;

mixing said oscillator signal with said input signal, thereby generating an intermediate frequency signal;

processing said intermediate frequency signal via a device under test, thereby generating an output signal;

delaying said oscillator signal by a predetermined time delay via a delay unit, thereby generating a delayed oscillator signal;

superposing at least a portion of said output signal with said delayed oscillator signal, thereby generating a superposed signal; and determining the response function of the transmission channel based on the superposed signal.

13. The method of claim 12, wherein the response function comprises at least one of an amplitude response, a phase response, a frequency response, a step response, an impulse response and a transfer function of the transmission channel.

14. The method of claim 12, wherein a square of an absolute value of the superposed signal is determined, thereby generating a power signal, and wherein the response function of the transmission channel is determined based on the power signal.

15. The method of claim 14, wherein said power signal is determined as a time averaged square of the absolute value of the superposed signal.

16. The method of claim 14, wherein said power signal is multiplied with a phase factor depending on the frequency of the oscillator signal and a propagation time difference between the delayed oscillator signal and said portion of the output signal.

17. The method of claim 16, wherein the power signal multiplied with said phase factor is filtered via a low-pass filter, thereby generating a filtered power signal, and wherein the response function of the transmission channel is determined based on said filtered power signal.

18. The method of claim 12, wherein the response function of the transmission channel is determined based on a response function of the delay unit.

* * * * *